(12) United States Patent
Lee et al.

(10) Patent No.: US 8,493,947 B2
(45) Date of Patent: Jul. 23, 2013

(54) SELECTING AN ACCESS POINT IN A WIRELESS NETWORK USING A DATA FLOW METRIC

(75) Inventors: Sung-Ju Lee, San Francisco, CA (US); JeongKeun Lee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 594 days.

(21) Appl. No.: 12/433,644

(22) Filed: Apr. 30, 2009

(65) Prior Publication Data

US 2010/0278158 A1 Nov. 4, 2010

(51) Int. Cl.
*H04W 4/00* (2009.01)

(52) U.S. Cl.
USPC ....... 370/338; 370/329; 370/341; 370/395.21

(58) Field of Classification Search
USPC ............ 370/329, 331, 332, 338, 341, 395.21; 709/225, 230; 375/260
See application file for complete search history.

(56) References Cited

U.S. PATENT DOCUMENTS

| | | | | |
|---|---|---|---|---|
| 2004/0039817 | A1* | 2/2004 | Lee et al. | 709/225 |
| 2005/0135316 | A1* | 6/2005 | Cromer et al. | 370/338 |
| 2005/0198337 | A1* | 9/2005 | Sun et al. | 709/230 |
| 2007/0115877 | A1* | 5/2007 | Zhen et al. | 370/329 |
| 2007/0147317 | A1* | 6/2007 | Smith et al. | 370/338 |
| 2009/0080381 | A1* | 3/2009 | Yashar et al. | 370/331 |
| 2009/0296835 | A1* | 12/2009 | Hidaka | 375/260 |

OTHER PUBLICATIONS

Bejerano, Y. et al., "Fairness and Load Balancing in Wireless LANs Using Association Control", MobiCom'04, ACM Sep. 2004.

* cited by examiner

*Primary Examiner* — Hassan Kizou
*Assistant Examiner* — Toan Nguyen

(57) ABSTRACT

Available access points (AP) are searched in a wireless network for information of each channel between a client and each AP and the information includes at least one network performance metric. A list of the available APs and the information are received at the client and the client has at least one interface used for communicating with each AP. A type of a data flow and a corresponding data flow metric for the type of data flow are also determined. An AP is selected to receive the data flow from the list of the available APs based on the information of each channel and the type of the data flow metric, and the data flow is received at the client from the selected AP in the wireless network.

19 Claims, 6 Drawing Sheets

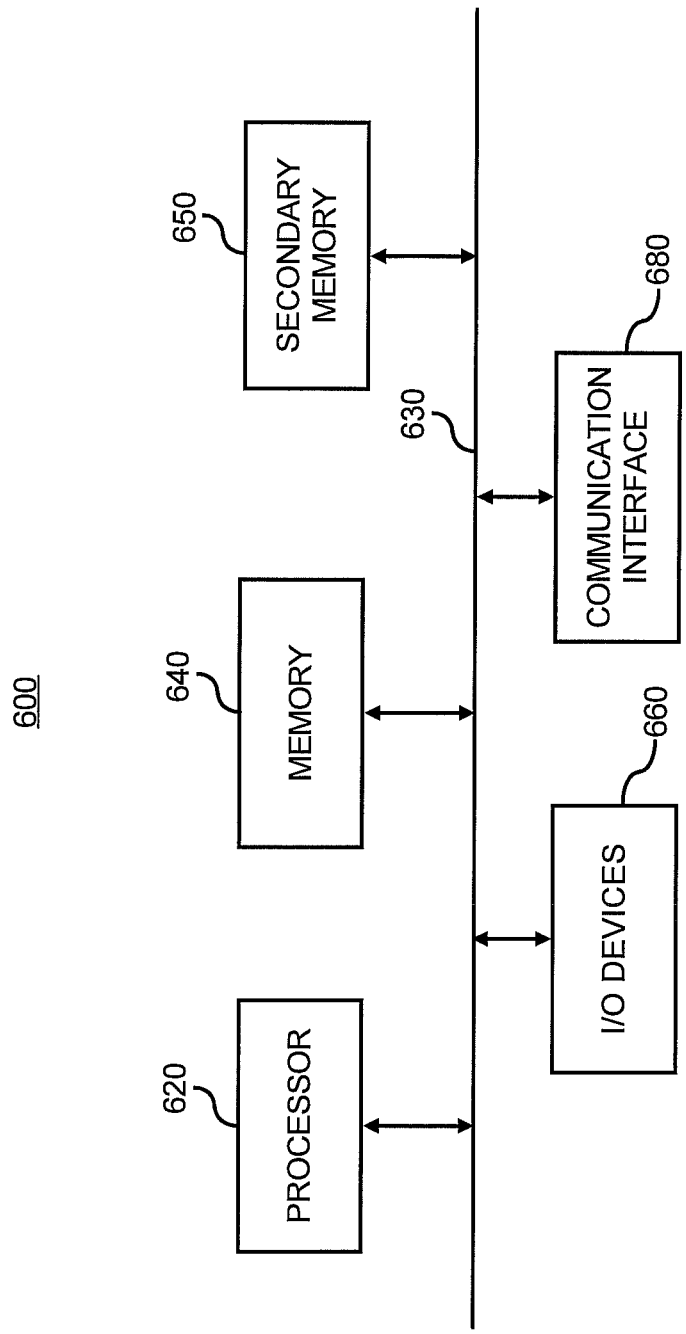

SELECTING AN ACCESS POINT IN A WIRELESS NETWORK USING A DATA FLOW METRIC

RELATED APPLICATIONS

The present application is related to U.S. patent application Ser. No. 12/433,718, entitled "Data Flow Routing In A Multi-Hop Wireless Network", by Sung-Ju Lee and JeongKeun Lee, which is incorporated by reference in its entirety.

BACKGROUND

A client in a Wireless Local Area Network (WLAN) associates with an Access Point (AP) to get connectivity, for example, to and from the Internet, and to further communicate with other clients via the WLAN. A client selects and relies on one AP for all data flows, although different APs may provide the better performance for different data flows. A data flow includes information, which may be for one application or service. The client can send or receive data flows via an AP in the WLAN and the data flows may pass through the WLAN to the Internet or another network.

When the connectivity of the client to an AP degrades, such as due to mobility or interference, the client may connect to another AP if the WLAN includes other APs in the client's communication range. Conventionally, a client may select a new AP based on Received Signal Strength (RSS). However, if a client has multiple data flows, one data flow may not necessarily benefit from an AP that has the best RSS. For example, a client's voice over IP (VoIP) data flow may benefit from an AP that provides the lowest latency channel rather than the best RSS, but another client data flow may benefit more from an AP providing the best RSS. Thus, selecting a new AP based on RSS may not benefit all existing client data flows.

Furthermore, conventionally, the client's all data flows in the WLAN are provided via a single AP to the client. However, as described above, a single AP may not provide the best communication channel for different types of data flows. Thus, at least one data flow may suffer performance degradation even though another data flow may benefit from the new AP.

BRIEF DESCRIPTION OF THE DRAWINGS

Features of the present invention will become apparent to those skilled in the art from the following description with reference to the figures, in which:

FIG. 6 shows a block diagram of a computer system that may be used as a platform for devices shown in FIG. 1, according to an embodiment of the present invention.

DETAILED DESCRIPTION

Figure 1:
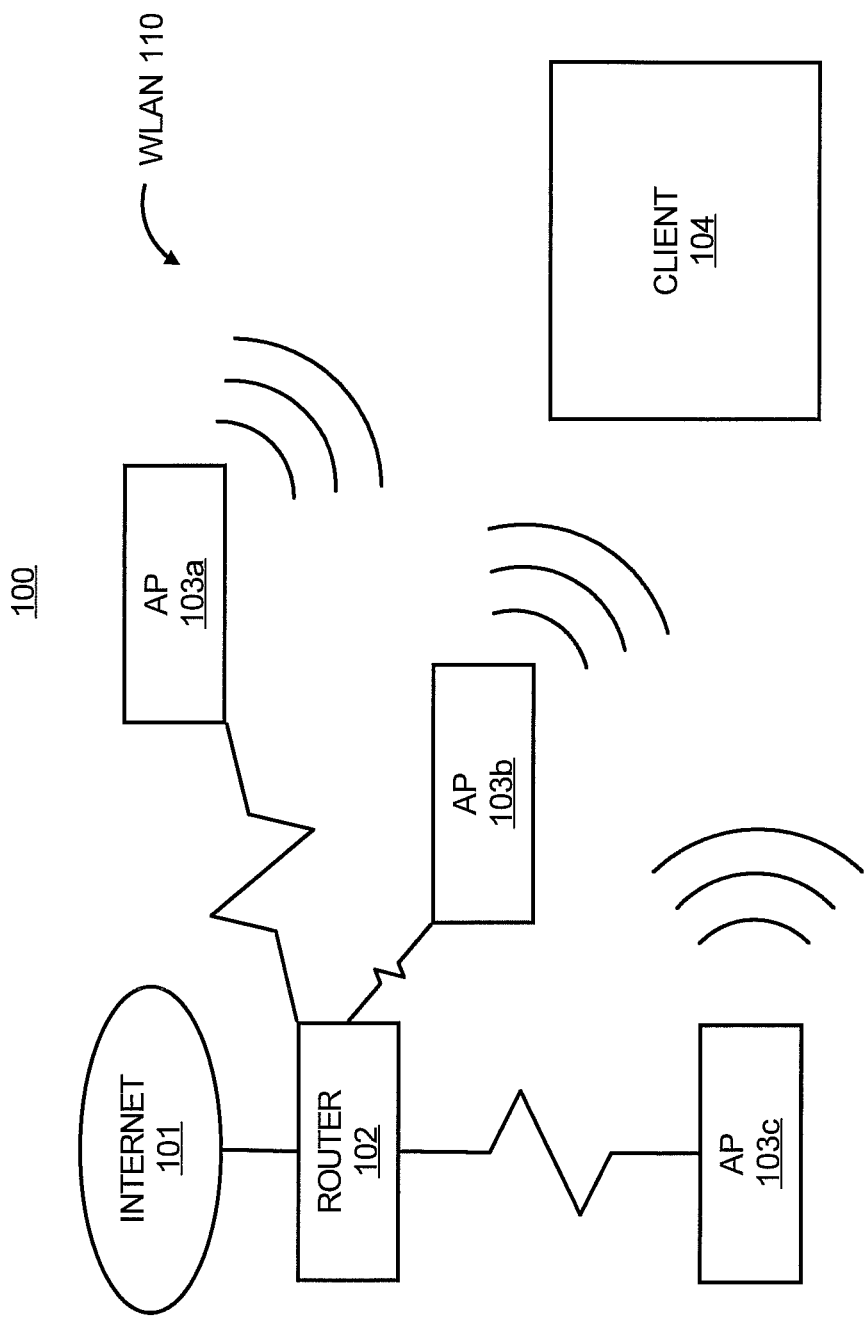
FIG. 1 shows a simplified block diagram of a system including a Wireless Local Area Network (WLAN), according to an embodiment of the present invention.

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

In an embodiment of the present invention, clients simultaneously use different APs for different type of data flows. Different network performance metrics can be used for the client to select different APs for different data flows. When a client needs to find an AP to associate with, it scans and searches the nearby APs in the wireless network to obtain information about the channels between the client and each AP. The channel information includes network performance metrics, such as RSS, latency, bandwidth (throughput), loss rate, etc. The client may obtain the values for each metric.

In an embodiment, when this information including the network performance metrics is gathered, the client stores the information, and when a new data flow arrives, the client selects an AP that provides the best performance for data flow using the channel information. Each type of data flow is associated with a data flow metric that identifies which data flow metric is most important for quality of service (QoS) for that type of data flow. Then, an AP is selected that provides the best performance for the data flow metric. For instance, for data flows such as Voice over IP (VoIP) or interactive network games, the client selects an AP that provides the minimum delay, as those flows are delay sensitive while for flows that require high bandwidth, such as a file download, it will be best to select the AP that provides the largest bandwidth. If reliability is the most important metric for a data flow (e.g., I-frames of MPEG video), the client selects an AP with the lowest loss rate. Note that the metrics measured for each AP are referred to as network performance metrics, whereas the metric(s) that corresponds to a data flow is referred to as a data flow metric.

In some instances a client may have multiple interfaces, and each interface can communicate with a different AP. However, if the number of data flows having different data flow metrics are greater than the number of client interfaces, then the client may prioritize data flows and select an AP providing a best network performance metric for the highest priority data flow. Then, multiple data flows are received from the same AP even though one or more of those data flows would be better served by using a different AP. However, after the highest priority data flow is completed, then the remaining data flows may be switched to the other AP providing better performance for one or more of those data flows, or the same AP may be continued to be used.

Methods of maintaining up-to-date channel information are implemented. One method for maintaining up-to-date channel information is to periodically scan/probe nearby APs to update the network performance metric values for each AP. Another method is for the client to obtain the channel information whenever it needs to re-associate a data flow as the associated AP no longer provides the required performance. Associating or re-associating a client with an AP includes the client connecting to an AP to receive a data flow. The IEEE 802.11k standard specifies a method for an AP to provide the associated client stations with the list of neighboring APs and information about the APs. The clients can use the AP list as potential APs to association with. As the clients associate with different APs for different data flows, instead of associating with only one AP for all data flows, the quality of service for each data flow improves. The methods described herein are not limited to be applied to a WLAN. The methods can also be applied to other wireless networks, such as Worldwide Interoperability for Microwave Access (WiMax) networks or other types of wireless networks.

FIG. 1 illustrates a block diagram of a system 100 including WLAN 110, according to an embodiment of the present invention. The system 100 includes Internet 101 and the WLAN 110. The WLAN 110 may be connected to an access network or any wide area network (WAN) or other network, and not just the Internet 101.

The WLAN 110 includes a router 102, multiple APs, shown as APs 103a-103c, and a client 104. More or less than three APs, more routers and more clients may exist in the WLAN 110. However, only the limited numbers of network devices are shown for illustration purposes.

An AP is a device that allows wireless communication devices, such as the client 104, to connect to a wireless network using a standard, such as an 802.11 standard or other type of standard. The APs 103a-103c are equipped for interfacing with the router 102, another network outside the WLAN 110 (e.g., the Internet or an access network) via the router 102, and the client 104. The client 104 is a device that can connect to the WLAN 110, and may include an end user device, such as a laptop, cell phone, etc.

In FIG. 1, the client 104 is wirelessly connected to one of the APs 103a-103c. The client 104 may be connected to the Internet 101 via one or more of the APs 103a-103c and the router 102 to send and receive data flows.

For example, the client may receive different types of data flows from different APs 103a-103c. Examples of types of data flows are VoIP, multiplayer game data, streaming video or audio, or bulk transfer of data. Each type of data flow is associated with a particular data flow metric, such as signal strength, latency, bandwidth, loss rate, etc. Also, each AP measures or otherwise determines network performance metrics for channels that the data flows are communicated on to the clients. The network performance metrics may be the same as the data flow metrics, so the network performance metric values for different APs that are also for the data flow metric for a particular data flow metric can be used to select an AP for the data flow. For example, if the data flow metric is latency, measured latency values from the network performance metrics are used to identify the best AP for the data flow.

Table 1 shows examples of network performance metric values for the APs 103a-103c.

TABLE 1

|  | AP 103a | AP 103b | AP 103c |
| --- | --- | --- | --- |
| RSS (dbm) | −70 | −65 | −55 |
| Delay (ms) | 25 | 20 | 30 |
| BW (Mb/s) | 50 | 40 | 75 |
| Loss Rate (%) | 5 | 15 | 10 |

Here, the AP 103a has the least loss rate, the AP 103b has the shortest delay, and the AP 103c has the highest bandwidth. Thus, it is advantageous for the client 104 to connect to the AP 103a for receiving a data flow that requires a small loss rate, such as streaming a video, to AP 103b for receiving a data flow that requires a shortest delay, such as a VoIP traffic, and to AP 103c for receiving a data flow that requires a high bandwidth, such as a large file download.

The client 104 has one or more interfaces for receiving one or more data flows. The interfaces may include radios for sending and receiving data for the data flows. The client 104 uses its interfaces to communicate with each AP. In addition, there is at least one communication channel between each client and each AP within range of the client and each AP includes channel information including network performance metrics or the values of the network performance metrics of the each AP.

Figure 2:
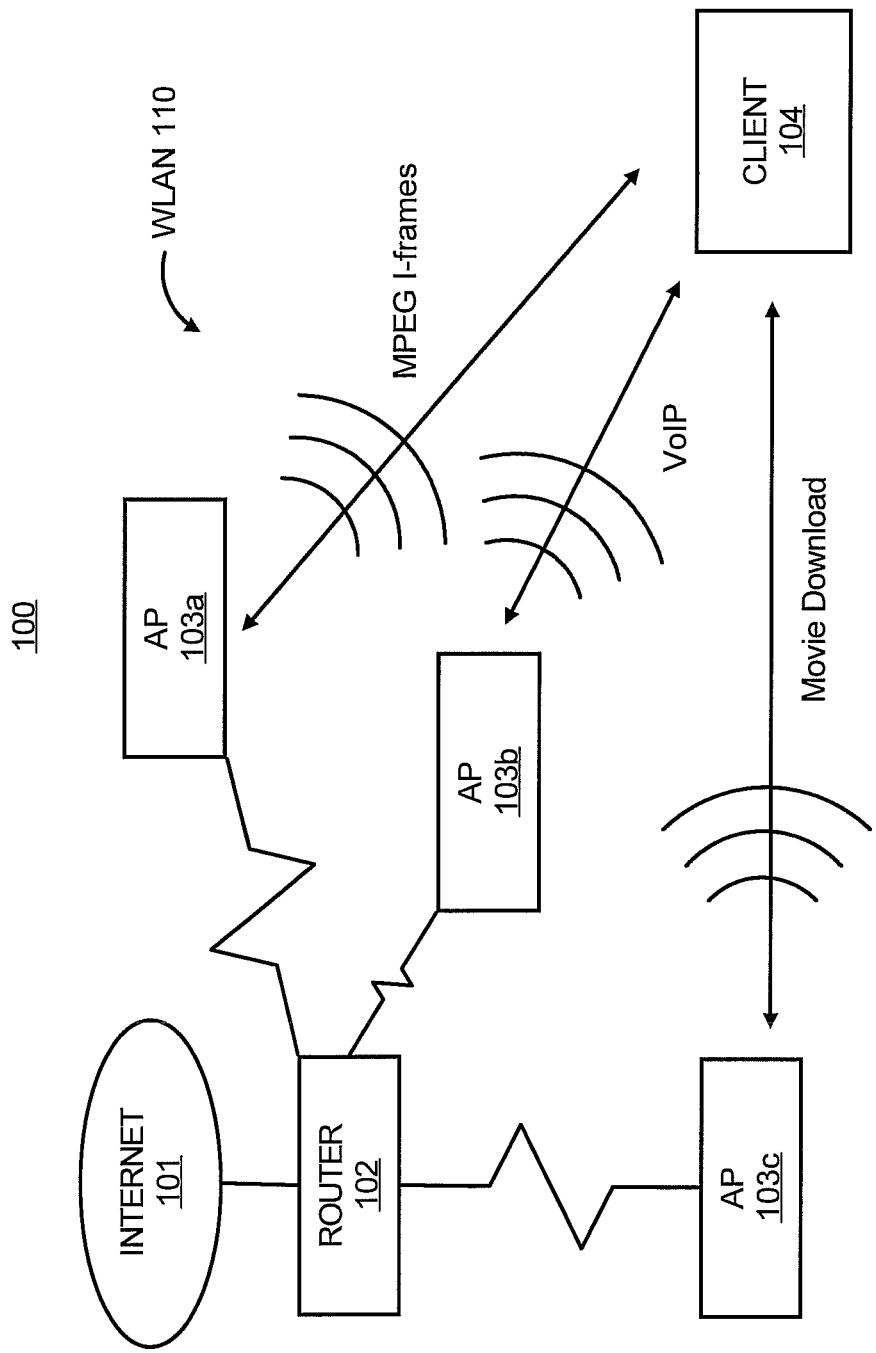
FIG. 2 shows a diagram of a system using data flow-based association for selecting APs in a WLAN, according to an embodiment of the present invention.

FIG. 2 shows a diagram of the system 100 of FIG. 1 using data flow-based association for selecting APs in a WLAN, according to an embodiment of the present invention.

In this example, the client 104 has three data flows including MPEG I-frames, VoIP, and downloading a movie file. The client 104 selects an AP to receive the data flows that provides the best data flow metrics for the data flows. The selection can be performed prior to receiving the data flow or after the data flow is being received, which may require switching the data flow to a new AP. Also, the client 104 is operable to receive data flows from different APs simultaneously if the client 104 has multiple interfaces (i.e., radios). If the client has one interface, then all the data flows are received from one AP. In that case, an AP may be selected that has the best network performance metric for one of the data flows. The data flows may be prioritized and the highest priority data flow is used to select the AP. After a data is completed, the lower-priority data flows may be switched to another AP that provides better performance for one or more of those flows. For instance, if VoIP is the most important flow, an AP with the shorted delay is selected, the VoIP data flow is served, and when the VoIP session is finished, the next most important flow (let's say bulk transfer) is served. A client can then switch to the AP with the highest throughput for that data flow, and so on.

The client 104 requests network performance metrics from all the APs 103a-103c. The client 104 stores a list of available APs, including three APs 103a-103c in this example, and information of at least one channel between the client 104 and each AP. The information of the at least one channel between the client 104 and each AP is the network performance metrics for each AP which are measured between the client 104 or another client and the APs.

For each data flow, the client 104 compares the network performance metrics for each AP to the data flow metric for each data flow to identify the AP that should provide the best performance or quality of service for the data flow. The client 104 stores a data flow metric for each type of data flow.

For example, the data flow metrics for the MPEG I-frames, VoIP, and movie file download data flows are loss rate, delay and bandwidth, respectively. The client 104 seeks an AP that has a least loss rate, an AP that has a least delay, and an AP that has a highest bandwidth. When the client receives the information of the at least one channel including the values of different network performance metrics of each AP, the client finds that the AP 103a has the best network performance metric value for the loss rate, the AP 103b has the best network performance metric value for the delay, and the AP 103c has the best network performance metric value for the bandwidth. Thus, the client 104 selects AP 103a for the MPEG I-frames, AP 103b for the VoIP, and AP 103c for the movie download.

The client 104 requests the APs to manage the corresponding data flows for the client 104, which includes sending and receiving packets for their respective data flows. For example, the AP 103b identifies packets received from the Internet 101 via the router 102 for the VoIP data flow, and sends those packets to the client 104. The router 102 may also be requested to send a data flow to the corresponding AP.

An embodiment of a method in which the system 100 may be employed for receiving data flow from APs in a WLAN will now be described with respect to the flow diagram of the method 300 depicted in FIG. 3. It should be apparent to those of ordinary skill in the art that the method 300 and for other methods described herein that other steps may be added or existing steps may be removed, modified or rearranged without departing from the scopes of the method 300. Also, the methods are described with respect to the system 100 by way of example and not limitation, and the methods may be used in other systems.

Figure 3:
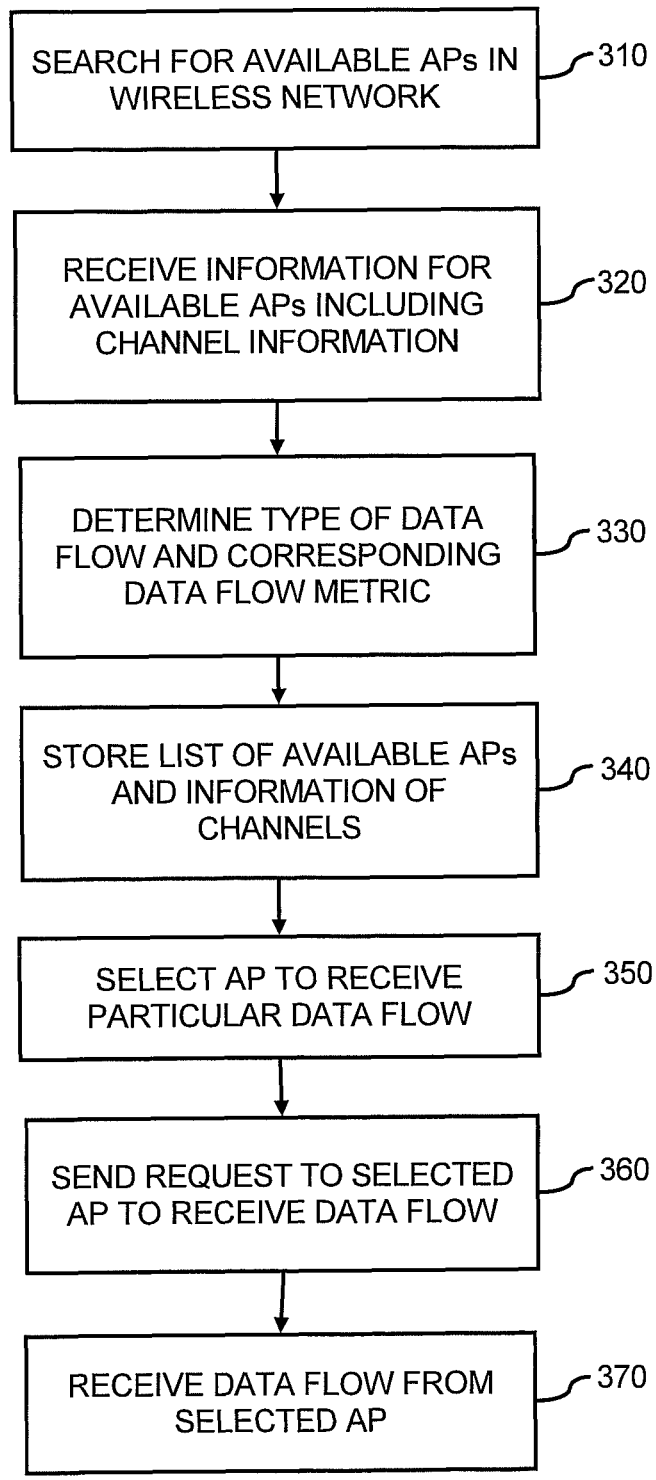
FIG. 3 illustrates a flowchart of a method for receiving a data flow from APs in a WLAN, according to an embodiment of the present invention.

FIG. 3 illustrates a flowchart of a method for receiving data flow from APs in a WLAN, according to an embodiment of the present invention.

At step 310, the client 104 searches for available APs in the wireless network. This may include broadcasting a message to all APs in the WLAN.

At step 320, the client 104 receives information from each available APs and determines information of at least one channel between the client and each AP. For example, each of the APs 103a-103c responds to the broadcasted message with an AP ID and network performance metrics for at least one channel from each AP are determined. In one example, the client measures the network performance metrics for each AP on a channel current being used by the AP. In another example, the client may determine the network performance metrics even for channels not currently being used by the AP through a scheduling process or other process whereby the client and the AP scan through each channel to measure the network performance metrics. In yet another example, the AP may store recent network performance metrics for at least one channel and send those metrics to the client. However, those network performance metrics may not be applicable to the client if they were measured by a client in a different location. Note that the client 104 has at least one interface that is used for communicating with each AP.

At step 330, the client 104 determines a type of a data flow and a corresponding data flow metric for the type of data flow to receive at the client 104. The data flow metric is determined for each data flow to be received by the client 104.

At step 340, a list of the available APs and the information of the at least one channel between the client and the each AP are stored at the client 104.

At step 350, an AP to receive a particular data flow therefrom is selected from the list of the available APs based on the information of the at least one channel and the type of the data flow metric by the client. Here, the type of the network performance metric from the selected AP should match the type of the data flow metric. For example, if the network performance metrics received from the AP 103b include bandwidth, delay and loss rate, the client 104 uses the delay network performance metric value to determine whether the AP 103b should be selected to receive the VoIP data flow.

At step 360, the client 104 sends a request to the selected AP to receive the data flow from the selected AP.

Finally, at step 370, the client 104 receives the data flow from the selected AP in the WLAN 110 via the interface of the client.

The step 350 describes using one data flow metric per data flow to select an AP for a data flow. However, in other embodiments, a type of data flow may have multiple data flow metrics that are used to select an AP to receive a data flow.

Figure 4:
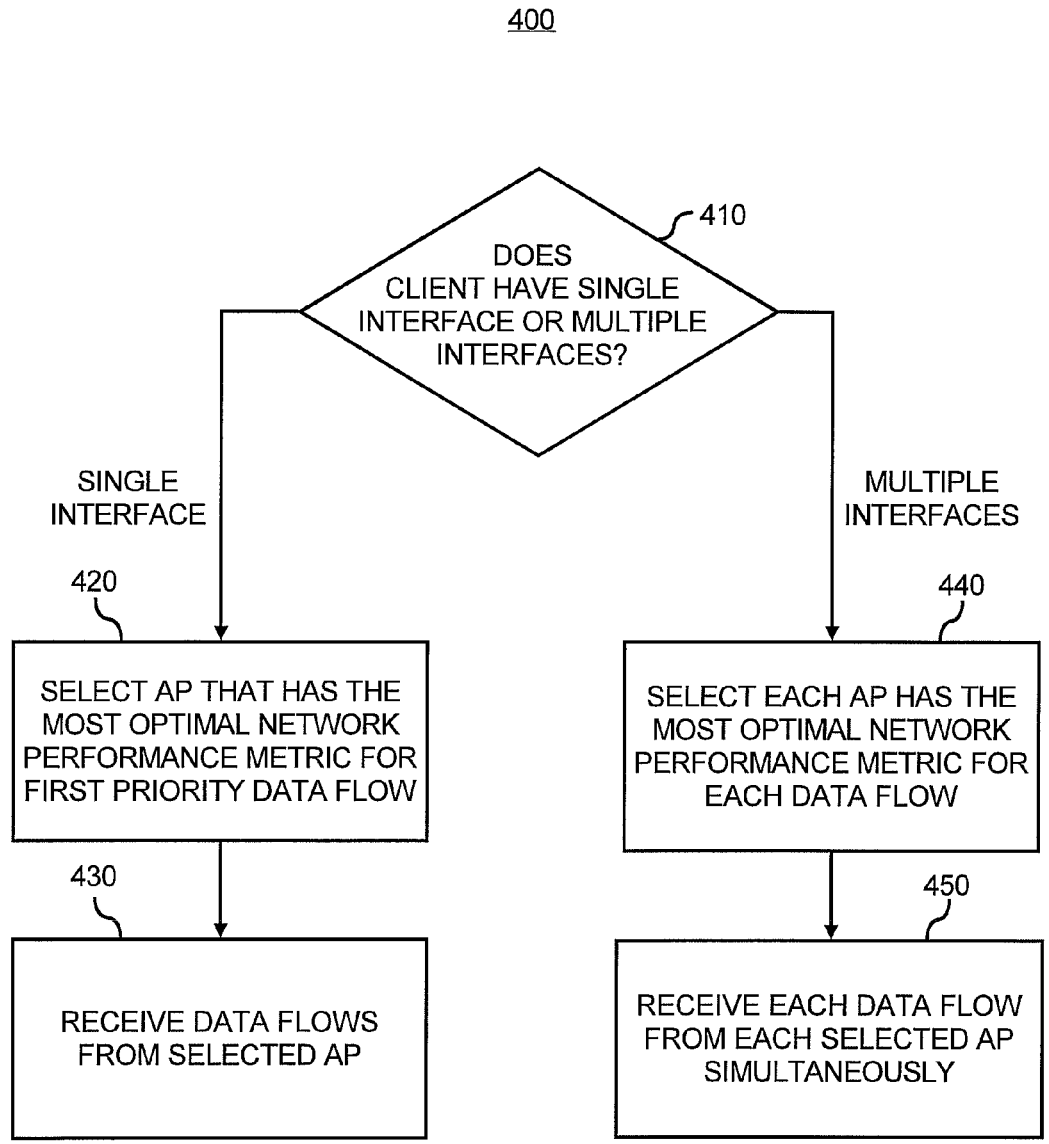
FIG. 4 illustrates a flowchart of a method for receiving data flow from APs when the client has one or more interfaces, according to an embodiment of the present invention.

FIG. 4 illustrates a flowchart of a method 400 for receiving data flow from APs when the client has one interface versus when the client has multiple interfaces for APs in a WLAN, according to an embodiment of the present invention.

At step 410, the client 104 determines whether the client 104 has a single interface or multiple interfaces.

At step 420, if the client 104 has a single interface, then the client 104 selects one AP that has the most optimal network performance metric for a first priority data flow for the client 104. The first priority data flow for the client may mean that the data flow is the most important data flow for the client. For example, when a client has three data flows, streaming an Internet TV (IPTV), VoIP, and downloading a movie file, the VoIP may be the first priority data flow for the client based on a predetermined setting or a recent user input. For example, if a user of the client 104 is conducting a very important communication via the VoIP data flow, then the user may select that data flow as the highest priority. The first priority data flow may be different for different clients and a client may chose the priorities of data flows of its own.

At step 430, the client 104 receives all data flows from the selected AP that has the most optimal network performance metric for a first priority data flow for the client 104.

At step 440, if the client 104 has multiple interfaces, then the client 104 selects multiple APs so that the each AP of the selected multiple APs has the most optimal network performance metric for the each corresponding data flow.

At step 450, the client 104 receives each data flow from each selected corresponding AP simultaneously.

Figure 5:
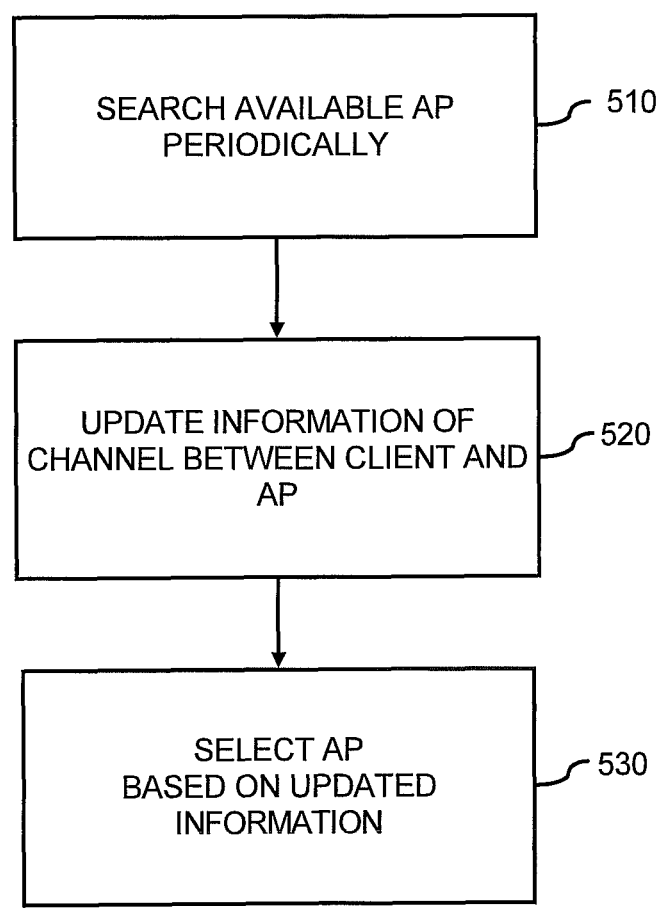
FIG. 5 illustrates a flowchart of a method for updating channel information of an AP and using the updated information to select a new AP for a data flow, according to an embodiment of the present invention.

FIG. 5 illustrates a flowchart of a method 500 for updating channel information of an AP and using the updated information to select a new AP for a data flow, according to an embodiment of the present invention. These steps may be performed after a data flow is initially being received.

At step 510, the available APs are periodically searched at predetermined intervals to update the network performance metrics for each available AP by the client 104.

At step 520, the information of the at least one channel between the client and each AP is updated at the client 104. This includes storing network performance metrics received from each of the APs 103a-103c.

At step 530, an AP from the list of the available APs is selected by the client 104 based on the updated information of the at least one channel. The selected AP may be different from an AP currently being used to receive the channel. In that case, the data flow is migrated to the new AP FIG. 6 shows the block diagram of a computer system 600 that may be used as a platform for a device configured to receive a data flow at a client from an AP in a wireless network. The computer system 600 may also be used to execute one or more computer programs performing the methods, steps and functions described herein. The computer programs are stored in computer storage mediums.

In one embodiment, the components of the computer system 600 in FIG. 6 can be grouped into subsystems. These flow-based subsystems interact with other devices throughout the system, including clients and their accompanying APs, to share the data flows and the APs resident within or sent to the wireless network, such as the WLAN 110 in FIG. 2.

The computer system 600 includes a processor 620, providing an execution platform for executing software. The processor 620 is configured to search available APs in the wireless network for information of at least one channel between the client and each AP and the information of the at least one channel includes one or more network performance metric. The processor 620 is further configured to receive a list of the available APs and the information of the at least one channel between the client and each AP, determine a type of a data flow and a corresponding data flow metric for the type of data flow, select an AP to receive the data flow from the list of the APs, send a request to receive the data flow from the selected AP, and receive the data flow.

Commands and data from the processor 620 are communicated over a communication bus 630. The computer system 600 also includes a main memory 640, such as a Random Access Memory (RAM), where software may reside during runtime, and a secondary memory 650. The secondary memory 650 may include, for example, a nonvolatile memory where a copy of software is stored. In one example, the secondary memory 650 also includes ROM (read only memory), EPROM (erasable, programmable ROM), EEPROM (electrically erasable, programmable ROM), and other data storage devices, include hard disks. The main memory 640 as well as the secondary memory 650 may store the list of the available APs, the data flow metric, and the information of at least one channel between the client and the each AP as discussed before. Here, the information of a channel includes at least one network performance metric.

The computer system 600 includes I/O devices 660. The I/O devices 660 may include a display and/or user interfaces comprising one or more I/O devices, such as a keyboard, a mouse, a stylus, speaker, and the like. A communication interface 680 is provided for communicating with other components. The communication interface 680 may be a wireless interface. The communication interface 680 may be a network interface. The communication interface 680 is configured to receive the list of the APs, the data flow metric, the information of at least one channel between the client and the each AP, and the data flow.

Some or all of the operations set forth in the methods and functions described herein may be contained as one or more computer programs stored in any desired computer readable storage medium and executed by a processor on a computer system. Exemplary computer readable storage media that may be used to store the software and may include Random Access Memory (RAM), Read Only Memory (ROM), Electrically Programmable Read Only Memory (EPROM), Electrically Erasable Programmable Read Only Memory (EEPROM), hard disks, or other data storage devices.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. At least one non-transitory computer readable storage medium storing instructions, the instructions executed by a processor to:
  receive network performance metrics for each of a plurality of channels existing between a client and respective access points (APs) in a wireless network;
  assign a priority to each of a plurality of types of data flows receivable at the client, wherein the plurality of types of data flows is greater than a number of interfaces of the client;
  select an AP having the network performance metric that matches a data flow metric of a highest priority data flow of the plurality of types of data flows and does not match a data flow metric of at least one other of the plurality of types of data flows;
  receive the plurality of types of data flows at the client from the selected AP until the highest priority data flow is completed; and
  receive remaining data flows of the plurality of types of data flows from another AP with the network performance metric that matches a data flow metric for a different data flow of the plurality of types of data flows.

2. The at least one non-transitory computer readable storage medium of claim 1, wherein the instructions executable by the processor to select the AP include instructions to:
  select the AP that has a most optimal network performance metric for the highest priority data flow.

3. The at least one non-transitory computer readable storage medium of claim 2, wherein the most optimal network performance metric comprises a best performance for transmitting the highest priority data flow.

4. The at least one non-transitory computer readable storage medium of claim 2, wherein the client receives the plurality of types of data flows from the selected AP over one interface.

5. The at least one non-transitory computer readable storage medium of claim 2, wherein the client receives the plurality of types of data flows from multiple different selected APs simultaneously.

6. The at least one non-transitory computer readable storage medium of claim 5, wherein each selected AP has a most optimal network performance metric for each corresponding data flow.

7. The at least one non-transitory computer readable storage medium of claim 1, wherein the client receives the highest priority data flow of the plurality of types of data flows from the selected AP and receives a lower priority data flow of the plurality of types of data flows from a second AP that has a most optimal network performance metric for the lower priority data flow after the client received the highest priority data flow.

8. The at least one non-transitory computer readable storage medium of claim 1, wherein the instructions include instructions to:
  store at the client a list of the respective APs and information of the plurality of channels between the client and the respective APs.

9. The at least one non-transitory computer readable storage medium of claim 8, wherein the instructions executable by the processor to store the information of the plurality of channels include instructions to:
  update the information of the plurality of channels between the client and the respective APs.

10. The at least one non-transitory computer readable storage medium of claim 9, wherein the instructions executable by the processor to update the information of the plurality of channels include instructions to:
  periodically scan the respective APs to update the network performance metric for the respective APs.

11. The at least one non-transitory computer readable storage medium of claim 9, wherein the instructions executable by the processor to update the information of the plurality of channels include instructions to:
  store at the client the updated information of the plurality of channels; and
  select from the client an AP from the list of the respective APs based on the updated information.

12. The at least one non-transitory computer readable storage medium of claim 1, wherein the instructions include instructions to:
send a request from the client to the selected AP to receive the highest priority data flow from the selected AP.

13. The at least one non-transitory computer readable storage medium of claim 1, wherein a type of the network performance metric from the selected AP matches the type of the data flow metric of the highest priority data flow.

14. The at least one non-transitory computer readable storage medium of claim 1, wherein the network performance metric and the data flow metric comprise at least one of signal strength, latency, bandwidth, and loss rate.

15. The at least one non-transitory computer readable storage medium of claim 1, wherein the type of the highest priority data flow comprises at least one of Voice over IP, streaming video, streaming audio, and a bulk transfer of data.

16. At least one non-transitory computer readable storage medium storing instructions, the instructions executed by a processor to:
receive network performance metrics for each of a plurality of channels existing between a client and respective access points (APs) in a wireless network;
assign a priority to each of a plurality of types of data flows receivable at the client, wherein the plurality of types of data flows is greater than a number of interfaces of the client;
select an AP having the network performance metric that matches a data flow metric of a highest priority data flow of the plurality of types of data flows and does not match a data flow metric of at least one other of the plurality of types of data flows;
send a request from the client to the selected AP to receive the plurality of types of data flows from the selected AP until the highest priority data flow is completed; and
send a request from the client to another AP with a network performance metric that matches a data flow metric for a different data flow of the plurality of types of data flows to receive the remaining data flows of the plurality of types of data flows from the other AP.

17. A system, the system comprising a processor in communication with a memory, wherein the processor is designed to carry out a set of instructions to:
receive network performance metrics for each of a plurality of channels existing between a client and respective access points (APs) in a wireless network;
assign a priority to each of a plurality of types of data flows receivable at the client, wherein the plurality of types of data flows is greater than a number of interfaces of the client;
select an AP having the network performance metric that matches a data flow metric of a highest priority data flow of the plurality of types of data flows and does not match a data flow metric of at least one of the multiple types of data flows;
send a request to receive the plurality of types of data flows from the selected AP until the highest priority data flow is completed; and
send a request from the client to another AP with a network performance metric that matches a data flow metric for a different priority data flow of the plurality of types of data flows to receive the remaining data flows of the plurality of types of data flows from the other AP.

18. A method for receiving multiple data flows at a client from an access point (AP) in a wireless network, the method comprising:
receiving network performance metrics for each of a plurality of channels existing between a client and respective access points (APs) in a wireless network;
assigning a priority to each of a plurality of types of data flows receivable at the client, wherein the plurality of types of data flows is greater than a number of interfaces of the client;
selecting an AP with a network performance metric that matches a data flow metric of a highest priority data flow of the plurality of types of data flows and does not match a data flow metric of at least one other of the multiple types of data flows;
receiving the plurality of types of data flows at the client from the selected AP until the highest priority data flow is completed; and
receiving remaining data flows of the plurality of types of data flows from another AP with the network performance metric that matches a data flow metric for a different data flow of the plurality of types of data flows.

19. The method of claim 18, wherein assigning a priority to each of the plurality of data flows receivable at the client includes assigning a priority based upon the type of data flow.

* * * * *